United States Patent Office 3,444,116
Patented May 13, 1969

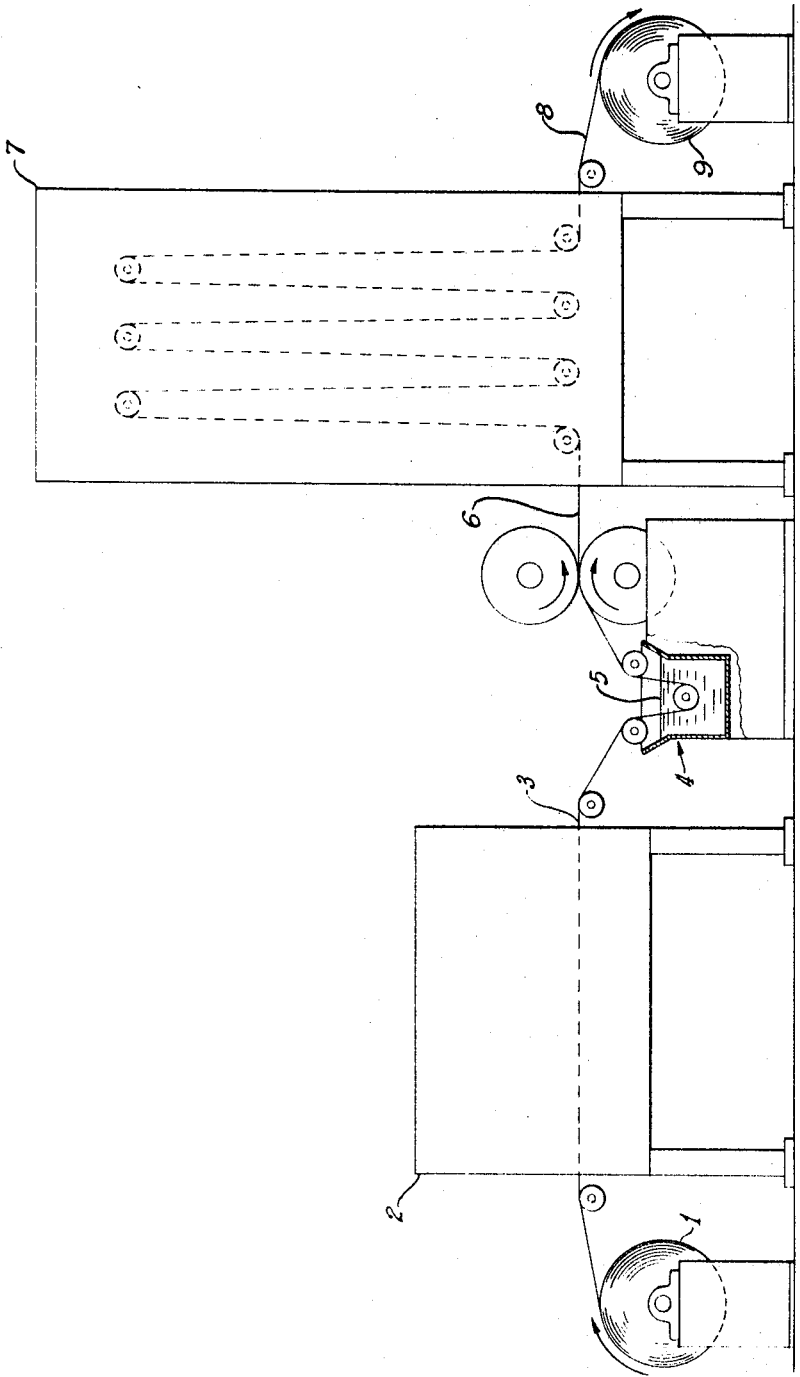

3,444,116
GLASS FIBER SIZING EMULSIONS COMPRISING EPOXIDIZED TRIGLYCERIDE AND CARBOXYLIC COPOLYMER
Roland K. Gagnon, Kraainem, Brussels, Belgium, Alfred Marzocchi, Cumberland, R.I., and Harold Rogers, Charlottesville, Va., assignors to Owens-Corning Fiberglas Corporation, Toledo, Ohio, a corporation of Delaware
Continuation-in-part of application Ser. No. 91,365, Feb. 24, 1961. This application May 16, 1966, Ser. No. 550,561
Int. Cl. D06m 15/38, 13/10
U.S. Cl. 260—23          6 Claims

ABSTRACT OF THE DISCLOSURE

A coating for woven fabrics, and particularly woven glass fibers providing improved "hand," flexibility, and abrasion resistance. The coating comprises an outer layer of particles of a polymeric material that is reactive with oxirane groups, and an intermediate flexible layer of particles of an epoxidized triglyceride one branch chain of which is attached to the polymeric material, and another branch chain of which is attached to the fibers of the fabric. The coating is deposited on the fibers from an emulsion of the polymer and the epoxidized triglyceride.

---

This invention relates to the treatment of fibers and particularly to the finishing of fabrics formed from fibrous glass.

The present application is a continuation-in-part of our copending application Ser. No. 91,365, filed Feb. 24, 1961, and now abandoned.

While the present invention will have utility with any type of fiber or other application where flexible coatings are desired, the invention solves peculiar problems encountered in the use of glass fibers, and so its application to glass fibers will hereinafter be explained in considerable detail.

The characteristics of fire, rot, vermin, and wrinkle resistance which are inherent in glass fibers, have served to create an extensive demand for fabrics woven from fibrous glass yarns. However, certain other intrinsic attributes act as impediments to the processing and weaving of glass fibers and to the realization of the potential, outstanding qualities of the fabrics. These stumbling blocks stem from the qualities of mutual abrasion, susceptibility to moisture attack and resistance to dyeing or pigmentation which are essential characteristics of glass fibers.

In order to form and process glass fibers without incurring extensive attrition resulting from the previously mentioned susceptibility toward mutual abrasion and moisture degradation, a composition termed a forming size is conventionally applied to the fibers immediately upon their formation. Such forming sizes normally contain a film-forming material such as a synthetic resin, starch or gelatin, which forms a protective sheath about the fibers and thereby shields them against the deleterious effects of both abrasion and moisture, which are experienced during basic processing steps such as forming, grouping, winding, twisting, plying, weaving, etc.

While the forming sizes exert their protective function during basic processing, their presence is incompatible with certain subsequent treatments such as the weave setting or heat crimping of the yarns in the ultimate woven relationship. The latter operations are performed upon the sized fibrous glass yarns embodied in the woven fabric and are employed to permanently set the weave and enhance the wrinkle resistance, fabric appearance and the drape or hang of the fabric. To achieve this condition, the fabrics are exposed to temperatures in excess of 1000° F. which serves to soften the glass fibers while in the woven form, and subsequently cooled to permanently set them in the crimped or woven form or relationship. As a consequence, the size compositions present upon the fibers at the time of weave setting are decomposed or volatilized to the end that the fibers and yarns of the fabric are left in a bare or unprotected condition.

Accordingly, the fabrics are once again subject to the harmful effects of abrasion and moisture and are possesed of a white or colorless appearance. In order to reestablish the protection of the fabrics and simultaneously impart coloring or pigmentation thereto, a second coating termed a finish is applied.

However, the attainment of a finished fabric is not accomplished merely by a second application of the forming size composition, due to the imposition of additional functional and aesthetic requirements stemming from requisite product characteristics and the divergent conditions to which the fabric is exposed as opposed to the conditions by the glass fibers prior to their incorporation in the fabric or woven form. In addition to serving as a protective sheath for the fibers in their woven arrangement, the coating or finish applied must also serve to provide qualities of abrasion, wash, moisture, rot, vermin and wrinkle resistance and adequate handle or tactile characteristics. In addition, the basic finish composition should be susceptible to employment as a bath or dispersion which is characterized by stability and uniformity or homogeneity of the emulsion or dispersion. According factors such as resin to glass bonding, toughness, resilience, pigment holding power, dye receptivity, film-forming qualities and abrasion resistance of the resin per se, are primary considerations in the formulation of a finish composition.

An object of the present invention is the provision of a new and improved coating for glass fibers and the like which is strong and durable and has greatly improved flexibility.

It is an object of this invention to provide materials and methods for the preparation of abrasion, moisture, and wrinkle resistant fabrics which are further characterized by excellent dye and pigment receptivity, superior tactile qualities and an ability to withstand washing without a color loss.

A further object is the provision of fibrous glass fabrics which exhibit unusual properties of abrasion, moisture, wrinkle and wash resistance, color fastness and handle.

The aforegoing objects are achieved by means of novel finishing compositions and methods, which provide coatings wherein emulsion sized particles of a resin having labile hydrogen, are deposited adjacent emulsion sized particles of an epoxidized triglyceride, and the particles are flexibly bonded together at points of contact by reaction of the labile hydrogen with the oxirane groups of the epoxidized triglyceride. It has been found that fibrous glass fabrics may be endowed with the necessary protective coating and outstanding product characteristics when the above methods and materials are employed either alone or in combination with other additives such as lubricants, dyes, pigments, coupling agents, water repellents and the like.

The methods and materials of the invention are preferably employed after the weaving of the fabric and the removal of forming size compositions from the fiber surfaces. Such removal may be achieved by methods such as those disclosed by U.S. 2,845,364 and 2,868,669.

The ingredients of the finish composition are preferably employed as an aqueous emulsion having solids in the following proportional ranges which are expressed in percentages by weight:

|   | Percent |
|---|---|
| Emulsion size particles of a resin | 10–45 |
| Emulsion size particles of an epoxidized triglyceride | 10–45 |
| Emulsifier, usually | .01–3 |
| Coupling agent | 0–3 |

A preferred formulation comprises:

|   | Percent |
|---|---|
| Acrylic resin | 9.9 |
| Epoxidized soya oil | 9.9 |
| Alkyl aryl polyether alcohol emulsifier | 0.2 |
| Water, remainder. | |

The acrylic resin employed in the preferred formulation is a nonionic emulsion of a copolymer of ethyl acrylate and acrylic acid in a 3 to 1 molar ratio and which contains 46% solids and has a specific gravity of 1.05 and a pH of 2.8. The above described resin is only exemplary of the types of resins having labile hydrogen which can be used in the present invention. Other suitable resins are emulsions of polyurethane resins, alkyd resins, and polyamide resins.

The epoxidized soya oil utilized possesses 7.4 oxirane groupings per glyceride unit. Other materials exemplary of the epoxidized triglycerides which can be used include polyepoxy animal, vegetable, and marine triglycerides, such as epoxidized soy bean oil, epoxidized safflower seed oil, epoxidized linseed oil, epoxidized menhaden oil, epoxidized sardine oil, and polyesters formed by heating an epoxidized fatty material with an organic dicarboxylic acid or anhydride, or an inorganic di- or tribasic acid until an exothermic reaction is initiated.

The finishing composition is formulated by admixing the epoxidized soy bean oil and the emulsifier and adding the mixture thus achieved to the acrylic resin with agitation. The epoxy-emulsifier mix is added to the acrylic resin in four equal parts with each portion thoroughly admixed before the next addition.

Equal parts of water and the epoxy-emulsifier-acrylic mix are then admixed with agitation and the remainder of the water is added.

When colors or dye are desired, a portion of the water may be replaced by an equivalent amount of dye to develop the desired shade.

The finish composition thus obtained may be applied with standard finishing apparatus with the padder or applicator employed preferably adjusted to impart 2–3.5% of the composition to the fabric. However, aqueous emulsion having as little as 0.5% or as much as 12% of the finish may be applied. When a dual treatment with two padders or applicators is utilized, the pickup or degree of application may be adjusted to achieve the total desired pickup in the two separate applications.

While aqueous emulsions of acrylic resins are preferred ingredients, acrylic resins generally may be employed. The term acrylic resin as utilized within the specification and claims is intended to encompass the polymers and copolymers of acrylic acid, methacrylic acid and the esters of these acids as well as the preferred copolymer of ethyl acrylate and acrylic acid.

The choice of the emulsifier employed is not restricted in scope except in regard to its power to emulsify the resins utilized. While an alkyl aryl polyether alcohol such as Triton X–155 is preferred, other emulsifiers such as polyethylene glycols and their esters, polyoxyethylene esters of mono- or dicarboxylic acids, alkyl aryl polyethylene glycol ethers, sorbitan esters and the like may also be employed.

The coupling agents or water repellent materials may comprise organosilanes such as those disclosed by U.S. 2,563,288, 2,582,215, 2,932,754 and 2,834,693 or Werner type complexes such as those disclosed by U.S. 2,359,858, 2,552,910, 2,733,182 and 2,744,835.

While aminosilanes such as delta-N-ethyl amine amino-butyl triethoxysilane and gamma-aminopropyl triethoxysilane are the preferred coupling agents having labile hydrogen, other vinyl, allyl and aryl silanes and the Werner complexes are suitable. While it is desirable to add the silane coupling agents directly to the finish bath, the Werner complexes such as stearato or methacrylato chromic chloride, due to their limited compatibility with the ingredients of the finish, are preferably applied and dried after the finish has been separately applied and cured. In the latter event, the finish fabric may be coated with a solution preferably containing between 0.1 and 5% by weight of the Werner complexes. Other coupling agents having labile hydrogen reactive with the oxirane groups of the epoxidized triglyceride are the organosilanes having labile hydrogen such as methyl hydrogen siloxane and other mono- and dihydrogen alkyl siloxanes.

Excellent anticrocking and color fixation qualities may also be obtained when chlorosilanes such as diphenyl dichlorosilane, methyl mono-, di-, or trichlorosilanes, or combinations thereof, or condensates of ethylene glycol with these or similar chlorosilanes are employed as additives in the finish or as after treatments comprising solutions of the chlorosilanes.

The described compositions are suitable for piece dyeing or for treating the fabrics with a low viscosity composition.

The finishing composition may be applied to the fabric by conventional methods and apparatus such as are depicted in the drawing which comprises a schematic view of apparatus which may be employed in line with a conventional weave setting operation. As shown, the fibrous glass fabric 1 is first exposed to a weave setting operation in an oven 2 having an interior temperature of between 1000° and 1500° F. and preferably of approximately 1200° F. As a result, the forming size present upon the fibers is volatilized or decomposed during passage through the oven and an uncoated fabric 3 emerges from the oven to be acted upon by a padder 4 which contains a bath 5 of the finishing compositions of the invention. The coated fabric 6 is then passed through a curing oven 7 which serves to cure the finish or coating and the finished fabric 8 is collected in a roll 9.

For best results the temperature of the curing oven 7 is maintained at between 300 and 350° F.

When a water repellent material or coupling agent which is incompatible with the finish composition is employed, a second padder similar to 4, or other coating apparatus may be inserted after the curing oven 7 and a second curing or drying oven may be inserted after the second padder.

In some instances, it may also be desirable to employ the aforementioned two padder system in applying two separate coatings of the composition to the fabric. This may be done when a highly durable coating or deep pigmentation is desired, and such a method also serves to conceal any coating defects embodied in the first coating.

While the apparatus and method depicted in the drawing comprise a preferred embodiment, other variations may also be resorted to. For example, coating techniques other than the padder-immersion method, such as conventional immersion, contact or transfer application or spraying may also be employed with an adjustment of the resin-solvent ratio to provide a viscosity and characteristics suitable for the application method selected. Also, the heating means used for both the heat cleaning and finish curing steps may be varied to include dielectric heating, exposure to heated fluids, etc.

The materials and methods of the invention provide finished fibrous fabrics which exhibit improved abrasion resistance, washfastness, color values and alternate light and wash values. The enhanced abrasion resistance of the finished fabrics is aptly demonstrated by the following table wherein an average indicia obtained from two samples of a fabric finished with a conventional finish composition containing polyethylacrylate and polytetrafluoroethylene and two similar samples finished with the composition of the examples are set forth:

Finishing composition: | Abrasion resistance (hrs. of endurance)
---|---
Polyethylacrylate-polytetrafluoroethylene | 3.5
Acrylic-epoxy | 6.0

The above values were obtained by measuring the time necessary to abrade the finished fabric and were derived by placing one yard square samples of a fabric provided with a 1½ inch hem in a modified Bendix washer. The four fins of the washer were covered with 9 inch widths of medium grit emery cloth and the washer was run continuously, with the exception of inspections conducted at 15 minute intervals, until 5 holes were worn completely through the edges of the hems of each of the fabric samples. The time in hours, required to achieve this degree of abrasion is the numerical value expressed in the above table. Each value is the average of the times required for the abrasion of the two samples tested. These values indicate an 85.7% improvement in the abrasion resistance of the fabrics finished according to the present invention.

Also of great significance are the improved crocking qualities and wrinkle resistance which are endowed to fabrics finished with the compositions of the invention. In the AATCC colorfastness to crocking standard test method (8–1957) fabrics treated with the compositions of the invention were rated class 5 with negligible color transfer, while the polyethylacrylate-polytetrafluoroethylene based finish contrasted in the abrasion test received a class 3 rating with moderate color transfer.

The wrinkle recoverability of fabrics finished with the compositions of the invention are readily apparent in that the fabrics when balled up in the hand exhibit a feeling of unusual resiliency, while upon release of the fabric from such compression, or after washing the fabric, the wrinkles may be seen to disappear very rapidly.

It should be noted that it is also feasible to apply the compositions of the present invention to glass fibers in forming, as well as to strands, yarns and fabrics formed from glass fibers, in order to impart the excellent abrasion resistance which characterizes the compositions of the invention, to the fibers.

It is apparent that new methods and compositions which provide fabric finishes characterized by greatly improved abrasion, wash and wrinkle resistance as well as enhanced color fastness, appearance and handle, are provided by the present invention.

It is further obvious that various changes, substitutions and alterations may be made in the compositions, methods and products of the present invention without departing from the spirit of the invention as defined by the following claims.

We claim:
1. An aqueous coating composition for forming a flexible film on fibers and the like, said composition consisting essentially of the following: up to approximately 45% by weight of a particulate copolymer of acrylic acid and a lower alkyl acrylate in approximately a 1 to 3 molal ratio having labile hydrogen that is reactive with oxirane groups and which particles are in the form of an emulsion, up to approximately 45% by weight of particles of an epoxidized triglyceride having at least two epoxy groups per molecule and which particles are in the form of an emulsion, a minor amount of an emulsifier sufficient to hold the above mentioned particles in a dispersed phase, and from 0 to approximately 3% by weight of a coupling agent having labile hydrogen reactive with an oxirane group, the balance being essentially water.

2. The aqueous coating composition of claim 1 wherein the polymeric material is an emulsion of a copolymer of ethylacrylate and acrylic acid.

3. The aqueous coating composition of claim 2 wherein the coupling agent is an amino containing organosilane.

4. Glass fibers having a coating thereon formed by drying the composition of claim 1 on the fibers.

5. Glass fibers having a coating thereon that includes a bonding agent adjacent the surface of the fibers, from approximately 14.7 to approximately 82% by weight of particles of an epoxidized triglyceride deposited in situ on the bonding agent from an aqueous emulsion and attached to the bonding agent, and from approximately 14.7 to approximately 82% by weight of particles of a copolymer of acrylic acid and a lower alkyl acrylate in approximately a 1 to 3 molal ratio deposited from an emulsion outwardly of said particles of epoxidized triglyceride and reacted therewith at locations spaced apart from said bonding agent.

6. The fibers of claim 5 wherein said polymer is a copolymer of ethylacrylate and acrylic acid.

References Cited

UNITED STATES PATENTS

| | | | |
|---|---|---|---|
| 2,949,438 | 8/1960 | Hicks | 260—23 |
| 3,119,711 | 1/1964 | Starmann et al. | 117—126 |
| 3,207,623 | 9/1965 | Marzocchi et al. | 117—126 |
| 3,249,412 | 5/1966 | Kolek et al. | 260—29.6 |

DONALD E. CZAJA, *Primary Examiner.*

R. A. WHITE, *Assistant Examiner.*

U.S. Cl. X.R.

117—126; 260—18, 29.2, 29.6